United States Patent Office 2,783,250

Patented Feb. 26, 1957

2,783,250

UNSATURATED ESTERS OF EPOXY-SUBSTITUTED POLYCARBOXYLIC ACIDS AND POLYMERS

George B. Payne and Curtis W. Smith, Berkeley, Calif., assignors to Shell Development Company, New York, N. Y., a corporation of Delaware No Drawing. Application June 28, 1954, Serial No. 439,907

11 Claims. (Cl. 260—348)

This invention relates to a new class of unsaturated organic compounds. More particularly, the invention relates to novel unsaturated esters of epoxy-substituted acids, and to the utilization of these esters, particularly as stabilizers and plasticizers and as monomers for the preparation of valuable polymeric products.

Specifically, the invention provides new and particularly useful polyfunctional esters of polycarboxylic acids containing at least one 1,2-epoxy group, i. e. a

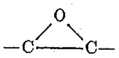

group, and ethylenically unsaturated alcohols, such as, for example, allylic and vinylic alcohols. The invention further provides valuable polymeric products obtained by polymerizing the above-described novel polyfunctional esters through the unsaturated linkages and/or through the epoxy groups alone or with other unsaturated monomers and/or epoxy-substituted monomers.

It is an object of the invention to provide a new class of unsaturated compounds. It is a further object to provide novel unsaturated esters of epoxy-substituted polycarboxylic acids and a method for their preparation. It is a further object to provide new polyfunctional esters of unsaturated alcohols and epoxy-substituted polycarboxylic acids which are particularly useful and valuable in the chemical and related industries. It is a further object to provide unsaturted esters of epoxy-substituted polycarboxylic acids which are valuable as heat and light stabilizers and plasticizing agents for halogen-containing-polymers. It is a further object to provide new unsaturated esters of epoxy-substituted polycarboxylic acids which may be polymerized through the unsaturated linkages and/or epoxy groups to form improved polymeric products. It is a further object to provide polymers of unsaturated esters of epoxy-substituted polycarboxylic acids which are useful in coatings, potting and castings.

Other objects and advantages of the invention will be apparent from the following detailed description thereof.

It has now been discovered that these and other objects may be accomplished in part by the novel esters of the invention which comprise esters of polycarboxylic acids containing at least one 1,2-epoxy group, and ethylenically unsaturated alcohols, such as, for example, allylic and vinylic alcohols. It has been found that these polyfunctional compounds possess many unobvious benefical properties which make them particularly adapted for many important commercial applications. These novel esters are, for example, good stabilizing agents for halogen-containing polymers, such as vinyl chloride polymers, and endow the resulting compositions with improved resistance to decomposition by heat and light. The novel esters are also valuable in the role of a plasticizer and softening agent for synthetic resins and rubbers. When added to the halogen-containing polymers, for example, the esters may act both as a plasticizing and a stabilizing agent. The above-described esters also act as lubricants and softening agents for textiles and when cured within the fibers tend to impart shrink resistance and water resistance to the fabrics.

It has also been found that the above-described esters may be polymerized through one of the functional groups, i. e. through the epoxy group or unsaturated linkage, to form polymers which may be utilized as such or may be subsequently cured through the remaining functional group or groups to form insoluble infusible polymers. Thus, the novel esters may be polymerized through the epoxy group by treatment with certain catalytic material such as amines, as described hereinafter, to form linear polymers possessing a plurality of unsaturated groups, and then this linear polymer may be treated with other types of catalytic material, such as peroxides, to cross-link the polymer through the unsaturated groups. The process may also be reversed and the esters may be first polymerized through the unsaturated groups and then cross-linked through the epoxy groups. As the esters possess at least two unsaturated groups, they may also be completely polymerized through the unsaturated groups to form cross-linked insoluble infusible products. In this case, the resulting product will possess active epoxy groups and may be useful in a variety of applications, such as ion-exchange resins, and the like. Related insoluble infusible polymers having active unsaturated groups may also be obtained from the unsaturated esters of epoxy polycarboxylic acids possessing a plurality of epoxy groups by completely polymerizing the monomers through the epoxy groups.

The novel unsaturated esters of the invention are also valuable in the preparation of new copolymeric products. Such products may be obtained, for example, by polymerizing the unsaturated ester monomers with dissimilar unsaturated monomers and/or epoxy monomers. Particularly valuable copolymeric products, however, are obtained by first forming linear polymers by polymerizing the unsaturated esters through the epoxy group and then reacting these linear polymers through the unsaturated side chains with dissimilar unsaturated monomers, or by first forming linear polymers by polymerizing the esters through the unsaturated linkage and then reacting the resulting polymers through the epoxy group with dissimilar epoxy monomers.

The epoxy-substituted polycarboxylic acids, the unsaturated esters of which are provided by the present invention, are those acids having at least one epoxy group in the acid molecule. The epoxy group or groups are preferably in an internal position and preferably at least one carbon atom removed from the carboxyl groups. The acids may possess 2, 3, or 5 or more carboxyl groups and may be of an aliphatic, aromatic or heterocyclic character and may be further substituted with substituents, such as chlorine atoms, ether radicals and the like. Examples, of these epoxy-substituted polycarboxylic acids include, among others, 8,9,12,13-diepoxyeicosanedioic acid, 8-epoxyethyl-10,11-epoxyeicosanedioic acid, 4,5-epoxy-cyclohexane-1,2-dicarboxylic acid, 8,9-epoxy-12-eicosenedioic acid, 6,7,10,11-diepoxyhexadecanedioic acid, 3,4,5,6-diepoxycyclohexane-1,2-dicarboxylic acid, 3,4,7,8-diepoxydecane-1,1,10-tricarboxylic acid, epoxidized dimeric linoleic acid, 5,6-epoxytetradecylsuccinic acid 6,7-epoxyhexadecanedioic acid, 7-epoxy-11-octadecenedioic acid, 3,4-epoxycylohexane-1,3-dicarboxylic acid and 5,6-epoxycyclohexane-1,3-dicarboxylic acid.

Preferred epoxidized polycarboxylic acids, the esters of which are provided by the present invention, include those obtained by epoxidizing various types of monoethylenically and polyethylenically unsaturated polycarboxylic acids. These include acids such as maleic acid, aconitic acid, itaconic acid, allylmalonic acid, 2-butenedioic acid and the like. A particularly preferred group of these include the monoethylenically unsaturated cyclic polycarboxylic acids obtained by condensing a maleic acid (or anhydride followed by hydrolysis) with a compound having a conjugated system of double bonds by a method such as disclosed in U. S. Patent 2,264,429. Examples of these unsaturated polycarboxylic acids include 4-cyclohexene-1,2-dicarboxylic acid, endomethylene 3,6-tetrahydrophthalic acid anhydride, 3-acetoxy-4-cyclohexene-1,2-dicarboxylic acid, 3-hexyl-4-cyclohexene-1,2-dicarboxylic acid, and 4,5-dimethyl-4-cyclohexene-1,2-dicarboxylic acid.

Another preferred group are the polyethylenically unsaturated cyclic polycarboxylic acids obtained by a related method wherein a chloromaleic acid is condensed with a compound having a conjugated system of double bonds and the resulting product dehydrohalogenated according to a method as shown in U. S. Patent 2,391,226. Examples of these acids include 1,4-cyclohexadiene-1,2-dicarboxylic acid, 6-ethyl-1,4-cyclohexadiene-1,2-dicarboxylic acid, 3-butyl-1,4-cyclohexadiene-1,2-dicarboxylic acid and 3,6-dimethyl-1,4-cyclohexadiene-1,2-dicarboxylic acid.

Other preferred acids are the 3,5-cyclohexadiene-1,2-dicarboxylic acids obtained by hydrolyzing 3-acyloxy-1,2,3,6-tetrahydrophthalic acids or anhydrides by the method shown in U. S. Patent 2,632,011. Examples of these acids include 3-methyl-3,5-cyclohexadiene-1,2-dicarboxylic acid, 1,2-dimethyl-3,5-cyclohexadiene-1,2-dicarboxylic acid, and 6-butyl-3,5-cyclohexadiene-1,2-dicarboxylic acid.

Another preferred group of ethylenically unsaturated polycarboxylic acids comprise those otbained by reacting maleic acid (or anhydride followed by hydrolysis) with an olefinic compound, such as octadecene-1, and the like, as disclosed in U. S. Patent 2,055,456 and U. S. Patent 2,294,259. Examples of these acids include 3-octadecenylsuccinic acid, eicosenylsuccinic acid, 4-nonadecenylsuccinic acid, tetracosenylsuccinic acid and hexadecenylsuccinic acid.

Also preferred are the polyethylenically unsaturated acids obtained by a related method wherein the maleic acid is reacted with a halogenated olefinic compound, such as chlorooctadecene, and then dehydrohalogenated. Examples of these acids include hexadecadienylsuccinic acid, octadecadienylsuccinic acid, nonadecadienylsuccinic acid and pentadecadienylsuccinic acid.

Still another preferred group of ethylenically unsaturated polycarboxylic acids are the dimerized unsaturated fatty acids, such as are obtained, for example, by heating ethylenically unsaturated monocarboxylic acids, such as linoleic acid, with a Friedel-Crafts catalyst such as boron trifluoride.

Also preferred are the polyethylenically unsaturated polycarboxylic acids obtained by treating a cyclic peroxide with a compound having a conjugated system of double bonds, such as butadiene and cyclopentadiene, in the presence of a heavy metal capable of existing in several valence forms, such as iron or cobalt. This method of preparation may be exemplified by the following equations showing the preparation of 8,12-eicosadienedioic acid from 1,1'-dihydroxydicyclohexyl peroxide (obtained from cyclohexanone and hydrogen peroxide) and butadiene in the presence of ferrous sulfate:

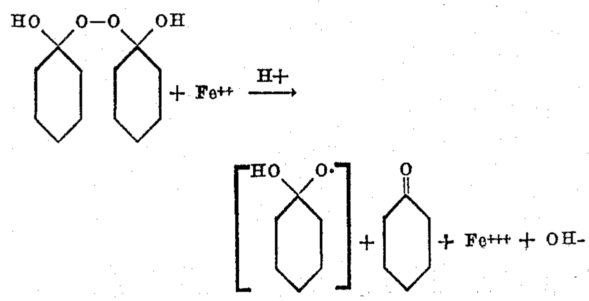

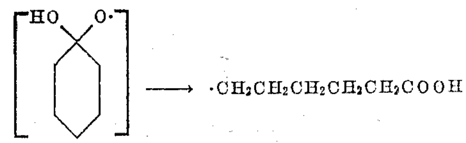

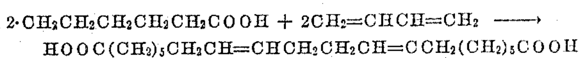

$$2\cdot CH_2CH_2CH_2CH_2CH_2COOH + 2CH_2{=}CHCH{=}CH_2 \longrightarrow HOOC(CH_2)_5CH_2CH{=}CHCH_2CH_2CH{=}CCH_2(CH_2)_5COOH$$

The acid produced by the above process also contains minor quantities of other acids, such as

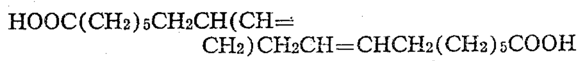

$$HOOC(CH_2)_5CH_2CH(CH{=}CH_2)CH_2CH{=}CHCH_2(CH_2)_5COOH$$

Particularly advantageous cyclic peroxides to be used in the process are those represented by the formula

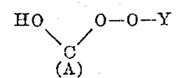

wherein Y is a hydrogen atom, a

HO—C(A)

radical, or a

HOO—C(A)

radical, and A is a divalent radical containing a chain of no more than 5 carbon atoms between the two free bonds of the radical, and preferably divalent hydrocarbon radicals which may be substituted, if desired, with functional groups, such as hydroxy, nitro, cyano, carboxy, ester, ether, and sulfone groups and halogen atoms.

Cyclic peroxide compounds to be used in the above process are preferably obtained by reacting hydrogen peroxide with a cyclic ketone of the formula

O=C(A)

wherein A is a divalent radical as described above. These peroxides can be produced as described in Milas, U. S. Patent 2,298,405, the products from equimolar amounts of cyclic ketone and hydrogen peroxide being chiefly the 1-hydroxy-1'-hydroperoxydicycloalkanyl peroxides

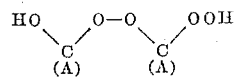

Preferred cyclic peroxides for use in the present process are the 1,1'-dihydroxydicycloalkanyl peroxides

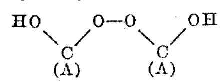

obtainable by use of two moles of cyclic ketone per mole of hydrogen peroxide.

The A in the above-described formula of the cyclic ketone is preferably unsubstituted methylene groups or methylene groups substituted with methyl, ethyl, propyl, butyl, benzyl, phenyl, cyclohexyl, chloro, bromo, hydroxy, methoxy, keto substituents, and the like. A may also form a part of a phenyl or cyclohexyl ring. Representative examples of such suitable divalent radicals include:

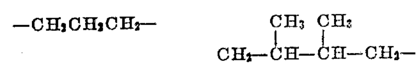

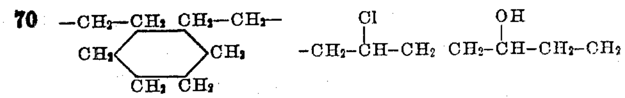

and the like.

Conjugated diethylenic compounds which can be reacted with the above-described cyclic peroxide compounds to produce the polyethylenic carboxylic acids include, among others, the conjugated diolefins, such as those of 4 to 18 carbon atoms as 1,3-butadiene, 1,3-pentadiene, isoprene, dimethyl-1,3-butadiene, 1,3,5-hexatriene, 2-ethyl-1,3-pentadiene, 2,4-octadiene, 1,1-dimethyl-3-tertiary butyl-1,3-butadiene, 2-phenyl-1,3-butadiene, 1,4-diphenyl-1,3-butadiene, 2-benzyl-1,3-butadiene, 2-cyclohexyl-1,3-butadiene, 1,1-diphenyl-3,5-hexadiene, cyclopentadiene, 1,3-cyclohexadiene, 1-methyl-2,4-cyclopentadiene, 2-methyl-1,3-cyclopentadiene, the mono- and di-methyl-1,3-cyclohexadienes, 1-vinyl-1-cyclohexene, 1-tertiary butyl-1,3-cyclohexadiene, and 1,3-cycloheptadiene are typical, and substitution products of such conjugated diolefins having as substituents functional groups such as hydroxy, nitro, cyano, carboxy, ester, ether and sulfone groups or halogen atoms. As halogenated conjugated diethylenic compounds, those containing one or more atoms of fluorine, chlorine and/or bromine are preferred. Representative examples of suitable halogenated conjugated diethylenic starting materials are chloroprene, 2,3-dichloro-1,3-butadiene, 1-chloro-2-methyl-1,3-butadiene, 2-chloro-1,3-pentadiene, 1-chloro-2,4-cyclopentadiene, 1-chloromethyl-2,4-cyclohexadiene, and the like. Other substituted conjugated diethylenic compounds which can be used successfully as starting materials are, for example, conjugated diethylenic alcohols such as 2,4-hexadiene-1-ol-1,3-hexadiene-5-ol, 2,4-octadiene-6-ol and 2,4,6-octatriene-1-ol, etc., ethers such as 2-methoxy-1,3-butadiene, 2-ethoxy-1,3-butadiene, 1-ethoxy-2,3-cyclohexadiene, etc., carboxylic acids of which vinyl acrylic acid, sorbic acid (2,4-hexadienoic acid), 4-methyl-2,4-pentadienoic acid, and muconic acid are typical, and esters of such acids, such as the methyl, ethyl, isopropyl, tertiary butyl, 2-ethylhexyl, decyl, and the like. 1-cyano-1,3-butadiene, 3-nitro-1,3-butadiene, 1-methylsulfonyl-1,3-butadiene, 3-vinyl-3-sulfolene, and the like, are examples of other suitable conjugated diethylenic compounds which may be used in the above-described process.

Preferred compounds having the conjugated system of double bonds to be used in the process are those of the formulae

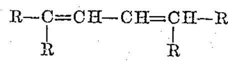

and

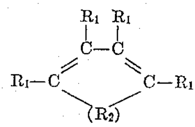

R and $R_1$ are members of the group consisting of hydrogen or hydrocarbon radicals, and preferably aliphatic hydrocarbon radicals containing from 1 to 8 carbon atoms and $R_2$ is a divalent alkylene group containing from 1 to 3 carbon atoms or a substituent derivative thereof which has one or more of the hydrogen atoms replaced by hydrocarbon radicals.

The proportions in which the cyclic peroxide and the compound possessing the conjugated system of double bonds are employed in the reaction may vary over a considerable range. In most cases, the peroxide and the compound possessing the conjugated system of double bonds will be employed in approximately equal molecular amounts, but larger or smaller amounts may be used as desired. Preferably, one mole of the peroxide will be reacted with from 1 to 2 moles of the compound possessing the conjugated system of double bonds.

The heavy metals, such as iron and cobalt, are employed in the reaction in at least equivalent amounts. The expression "equivalent amount" in this regard refers to that amount required for the formation of free radicals from one molecule of peroxide. The heavy metals are preferably employed in amounts varying from 1 to 1.5 equivalents.

In place of the equivalent or excess amounts of the heavy metals, however, one can use smaller amounts of the metals together with a reducing agent which serves to convert the metal ions back to the lower valence form, e. g., ferric ions to ferrous ions, as fast as they are formed. Examples of such reducing agents include 1-ascorbic acid, sodium formaldehyde sulfoxylate, sodium bisulfite, reducing sugars, and the like.

The reaction between the peroxide and the compound possessing the conjugated system of double bonds may be effected in water, solvents or emulsions. The reaction is preferably carried out in the presence of common solvents, such as methanol, ethanol, tertiary butanol, benzene, diethyl ether, methyl acetate, acetone, dioxane, and the like, or mixtures thereof or mixtures of these solvents with water.

Temperatures employed in the reaction between the peroxide and the compound possessing the conjugated system of double bonds may vary over a considerable range, but is generally maintained between about −40° C. to 80° C. Pressures may be atmospheric, superatmospheric or subatmospheric.

Of special value are the mono- and polyethylenically unsaturated aliphatic and cycloaliphatic dicarboxylic acids containing at least six carbon atoms and no more than 26 carbon atoms, and more preferably no more than 22 carbon atoms.

Coming under special consideration, particularly because of the improved properties of the polymers obtained therefrom, are the diethylenically unsaturated dicarboxylic acids, such as those obtained by condensing a chloromaleic acid with a compound having a conjugated system of double bonds and then dehydrohalogenating the resulting product, those obtained by reacting a halogenated olefinic compound with maleic acid and dehydrohalogenating the resulting product, those obtained by dimerizing unsaturated fatty acids, and those obtained by reacting a cyclic peroxide with a compound having a conjugated system of double bonds.

The epoxidation of the above-described unsaturated polycarboxylic acids may be accomplished by reacting the acid with an epoxidizing agent, as described hereinafter.

The unsaturated alcohols, the esters of which are provided by the present invention, are the monohydric alcohols having at least one aliphatic carbon-to-carbon unsaturated linkage, e. g. an ethylenic linkage, or acetylenic linkage, preferably not more than four carbon atoms removed from the terminal hydroxyl group. The alcohols may be substituted with aliphatic, alicyclic, aromatic or heterocyclic radicals. They may contain other elements in the molecule, such as —O—, —SO— and $SO_2$— linkages, and may be further substituted with substituents, such as halogen atoms, alkoxy radicals, and the like.

One group of the above-described unsaturated alcohols are the alpha, beta-ethylenically unsaturated alcohols which are sometimes referred to as "vinylic" alcohols. Many of these alcohols have never been isolated and require special methods, described hereinafter, for the preparation of their esters. These alcohols may be exemplified by vinyl alcohol, 1-isopropenol, 1-hexenol, 1-butenol, 3-chlorobuten-1-ol, 3-bromohexen-1-ol, and 3-ethylcyclopenten-1-ol and the like.

Another group of the unsaturated alcohols are the beta, gamma-ethylenically unsaturated alcohols. These alcohols are often referred to as "allylic" alcohols. They may be exemplified by allyl alcohol, crotyl hexadienol, 2-methyl-2-hexenol, 5-chloro-2-octenol, 3-cyclohexyl-2-octenol, 4-phenyl-2-heptenol, 2,4-dichloro-2-hexenol, 2-cyclohexenol, and 3-ethyl-2-octenol.

Still another group of unsaturated alcohols are those monohydric alcohols containing a triple bond in the beta, gamma positions, such as propargyl, 2-pentynol, 4-chloro-2-hexynol and the like.

Particularly preferred unsaturated alcohols are the alpha,beta-ethylenically unsaturated aliphatic monohydric alcohols containing from 2 to 15 carbon atoms, and the beta,gamma-ethylenically unsaturated aliphatic monohydric alcohols containing from 3 to 18 carbon atoms. Examples of these preferred alcohols are vinyl alcohol, allyl alcohol, 2-hexenol, 2-chloro-2-hexenol, 1-pentenol, 3-chloro-2-octenol, 3,5-dibutyl-2-decenol, 3-butyl-1-octenol, and the like. Of special interest are the alkenols and particularly the 1-alkenols and 2-alkenols containing no more than 12 carbon atoms.

The novel esters of the invention may be exemplified by the following: diallyl 4,5-epoxycyclohexane-1,2-dicarboxylate, dimethallyl 3 - chloro - 4,5 - epoxycyclohexane - 1,2 - dicarboxylate, divinyl 4,5 - epoxycyclohexane - 1,2 - dicarboxylate, dicrotyl - 3,6 - dimethyl-4,5 - epoxycyclohexane - 1,2 - dicarboxylate, divinyl 8,9,12,13 - diepoxyeicosanedioate, diallyl 2,3 - epoxyoctadecylsuccinate, di(3'-hexenyl) - 2,3 - epoxyhexadecylsuccinate, diallyl 1,2,4,5 - diepoxycyclohexadiene - 1,2-dicarboxylate, dichloroallyl 1,2 - epoxy - 4 - cyclohexene-1,2 - dicarboxylate, di(4'-hexenyl) - 3,6 - dimethyl-1,2,4,5 - diepoxycyclohexane - 1,2 - dicarboxylate, diethallyl-1,2 - dimethyl - 3,4,5,6 - diepoxycyclohexene - 1,2-dicarboxylate, diallyl - 8,9,12,13 - diepoxyeicosanedioate, dimethallyl - 8 - epoxyethyl - 10,11 - epoxyeicosanedioate, divinyl - 7,8,11,12 - diepoxyoctadecanedioate, dicrotyl-7,8,11,12 - diepoxyoctadecanedioate, di(4' - hexenyl)-7-epoxyethyl - 9,10 - epoxyhexadecanedioate, di(4' - octenyl) - 1,2,4,5 - diepoxycyclohexanedicarboxylate, di(3'-pentenyl) - 10,11 - dihexyl - 8,9,12,13-diepoxyeicosanedioate, diallyl - 1,2 - epoxy - 4 - cyclohexene - 1,2 - dicarboxylate, diallyl bis(2,3-epoxypropyl)malonate.

The above described esters of the invention may be obtained by any suitable method. They may be prepared, for example, by reaction of the above-described epoxy-substituted carboxylic acids and unsaturated alcohol, or they may be prepared by esterification of an unsaturated polycarboxylic acid which corresponds to the desired epoxypolycarboxylic acid with the unsaturated alcohol and then epoxidizing the resulting products so as to effect selective epoxidation of the ethylenic group or groups in the acid molecule.

The esterification of the unsaturated alcohols with the epoxy-substituted acids or the unsaturated acids may be accomplished by heating the components together and removing the water of esterification, preferably as fast as it is formed in the reaction mixture.

Catalysts may be used in the direct esterification process if desired, but their presence is not essential to the success of the process. If catalysts are employed they should be relatively mild so as to not affect the epoxy group on the acid molecule. Suitable catalysts include formic acid, monosodium sulfate, aluminum sulfate, and the like. Such catalysts are generally employed in amounts varying from about 0.1% to 5% by weight.

The amount of the alcohols and acids employed will vary over a considerable range. Preferably one employs an equivalent amount of alcohol and acid. As used herein, equivalent amount refers to that amount needed to furnish a hydroxyl group for every carboxyl group to be esterified.

The esterification may be accomplished in the presence or absence of solvents or diluents. In case the solvents or diluents are desired, inert organic materials, such as benzene, toluene, cyclohexanone, and xylene are generally preferred.

The temperature employed during the esterification may vary over a considerable range depending upon the type of reactants and catalyst to be employed. In most cases, the temperature will range between about 40° C. to 100° C. with a preferred range being between 50° C. to 80° C.

In some cases it may be desirable to conduct the reaction in an inert atmosphere, such as nitrogen. Atmospheric, superatmospheric or subatmospheric pressures may be used.

The separation of the esters formed in the reaction may be accomplished by any suitable means, such as extraction, distillation, fractional precipitation, and the like.

As indicated above, many of the vinylic alcohols cannot be isolated and special methods must be employed in producing their esters. One of the preferred methods for producing esters of these alcohols is to react the desired acid with acetylene in the presence of a mercuric salt, such as mercuric sulfate. A more detailed description of this process may be found in U. S. 1,084,581. Another preferred method comprises reacting the desired acid with a previously formed vinyl ester, such as vinyl acetate, in the presence of an ester-exchange catalyst. A more detailed description of this method may be found in U. S. 2,245,131. Still other methods consist of treating a vinyl-type halide with the sodium or silver salt of the desired acid.

The epoxidation of the unsaturated acids to prepare the above-described epoxy-substituted acids and the epoxidation of the unsaturated esters of the unsaturated acids to produce the novel epoxidized esters, may be accomplished by reacting the unsaturated reactant with an epoxidizing agent. Organic peracids, such as performic, peracetic acid, perbenzoic acid, monoperphthalic acid and the like, are preferred agents for this reaction.

The amount of the epoxidizing agent employed will vary over a considerable range depending upon the type of product desired. In general, one should employ at least one mole of the oxidizing agent, such as perbenzoic acid, for every ethylenic group to be epoxidized. Thus, to produce 8,9,12,13-diepoxyeicosanedioic acid from 8,12-eicosadienedioic acid, one should react the said unsaturated acid with at least two moles of perbenzoic acid. In some cases, it is rather difficult to effect epoxidization of all of the ethylenic groups and if a completely epoxidized product is required, additional epoxidizing agent and/or longer reaction period may be required.

It is preferred to carry out the epoxidation reaction in a suitable mutual solvent for the reactants and product. Chloroform is an especially useful solvent for the purpose, but other materials, such as ethyl ether, dichloromethane, benzene, ethyl acetate, etc., and the like, may be used.

The temperature employed during the epoxidation may vary over a considerable range depending upon the type of reactants and oxidizing agents selected. It is generally desirable to maintain the temperature between —20° C. to 100° C. As indicated hereinafter, if the material being epoxidized is an unsaturated ester of an unsaturated acid, it is preferred to conduct the reaction at the lower temperature, e. g., below 40° C., in order to avoid epoxidation of unsaturated groups in the alcohol portion of the molecule. Atmospheric, superatmospheric, or subatmospheric pressures may be employed as desired.

The epoxidized products obtained by this method may be recovered from the reaction mixture by any convenient means known to the art, such as distillation, extraction, fractional precipitation and the like.

If one employs unsaturated esters of the unsaturated polycarboxylic acid, such as diallyl 8,12-eicosadienedioate, in the epoxidation reaction, care should be taken to avoid epoxidation of the unsaturated linkages in the alcohol portion of the ester molecule. This can be done very easily if the double bonds in the acid portion of the molecule are internal double bonds, i. e. double bonds joined to other carbon atoms, and the double bonds in the alcohol portion of the molecule are terminal double bonds, i. e. have the structure $CH_2=C=$. In this case, it is known that the internal double bonds are much more reactive with the epoxidizing agents at the lower reaction temperatures and are converted to epoxy groups before the terminal double bonds are effected. Thus, to epoxidize esters of this type to form the desired unsaturated esters of the epoxy acids, one needs only to treat the unsaturated ester with the theoretical amount of the epoxidizing agent as indicated above at a lower temperature, e. g. below about 40° C. for a short reaction period, such as up to about 10 to 15 hours, and then recover the desired unsaturated ester from the reaction mixture.

The novel esters of the invention are relatively high-boiling liquids to semi-solids. They are soluble in a great many oils and solvents and are compatible with many synthetic polymers and resins. The esters are particularly valuable as additives for vinyl polymers as they act to plasticize the polymer and form compositions having good flexibility and strength over a wide range of temperature.

The vinyl polymers that may be plasticized with the novel esters of the invention include the homopolymers, copolymers and interpolymers of the vinyl-type monomer, i. e. those monomers having a $CH_2=C-$ group, such as styrene, alpha-methyl styrene, vinyl naphthalene, vinyl phenol, acrylic acid esters as methyl acrylate, propyl acrylate, butyl acrylate, esters of substituted acrylic acids, such as methyl methacrylate, lauryl methacrylate, hexyl methacrylate, vinylidene chloride, vinyl chloride, acrylonitrile, methacrylonitrile, vinyl esters of vinyl acetate, vinyl benzoate, vinyl caproate, diallyl phthalate, diallyl succinate, vinyl ethers, such as vinyl ethyl ether, vinyl butyl ether, the vinyl ketones, vinyl pyridine, and the like.

Particularly preferred materials to be plasticized with the novel esters are the halogen-containing polymers and copolymers, and particularly the homopolymer of the vinyl halides and copolymers of the vinyl halides with dissimilar monomers as the unsaturated esters.

A single novel ester may be used as the plasticizer or a mixture of two or more of the compounds may be utilized. In addition, the esters may be used as plasticizers in combination with other plasticizing materials, such as dioctyl phthalate, dibutyl phthalate, tricresyl phosphate, dibutyl sebacate, and the like.

The amount of the esters to be incorporated with the above-described polymers may vary over a considerable range depending upon the particular type of polymer, intended use of the product, etc. In most cases the amount of the plasticizer will vary from about 20 to 150 parts by weight per 100 parts by weight of resin. A more preferred range of plasticizer comprises 40 parts to 75 parts by weight for every 100 parts by weight of resins.

The polymer and ester may be compounded by means of conventional equipment such as mills of the heated roll type of internal mixers. The plasticizer and other compounding ingredients, such as fillers and stabilizers, are worked into the vinyl resin so that they are thoroughly dispersed therein by means of such equipment and the resultant composition then molded, calendered, extruded or otherwise formed into articles of the desired shape by conventional procedure.

The novel esters of the invention may also be used as stabilizing agents for halogen-containing polymers. The esters are easily compatible with these polymers and in combination therewith form compositions which have good resistance to discoloration by heat and/or light. The novel esters may be used as stabilizer by themselves or they may be used in combination with other stabilizing agent, such as urea and thiourea derivatives, metal salts or organic and inorganic acids, and the like.

In most cases, the esters are effective as stabilizers in amounts varying from about .1% to about 20% by weight of the polymer being stabilized, but larger or smaller amounts may be employed as desired or necessary. If other stabilizers are employed in combination with the novel esters, the esters may generally be utilized in smaller quantities, such as from about .01% to about 10% by weight of the polymer.

The esters may be incorporated into the halogen-containing polymers by any suitable method. They may be added in a dissolved, suspended or pulverulent state to the desired polymer which in turn may be in a dissolved, dispersed or solid stage. In some cases, it may be possible to introduce the novel esters in the reaction mixture during the formation of the halogen-containing polymer. In most cases, however, it will probably be more desirable to add the ester by merely mixing the polymer and ester in a masticator or on heated differential rolls.

As noted above, the novel esters also act as plasticizing materials for these halogen-containing polymers so with these polymers it is possible to utilize the esters as combined stabilizer-plasticizers. In this case, the esters will be added in amounts and in the manner described hereinabove for the use of the esters as plasticizers and in that case the resulting composition will display the desired improvement in flexibility as well as increased resistance to heat and light.

The unsaturated esters of the present invention are particularly useful in the preparation of polymeric products. As indicated above, they may be polymerized through the epoxy group or groups and/or through the unsaturated group of groups. Polymerization through the unsaturated group or groups may be effected by heating the monomer or monomers in the presence of an addition polymerization catalyst, such as a peroxide catalyst. Examples of such catalysts include, among others, benzoyl peroxide, acetyl peroxide, benzoyl acetyl peroxide, tertiary butyl perbenzoate, lauryl peroxide, dibutyryl peroxide, succinyl peroxide, tertiary alkyl hydroperoxides such as tertiary butyl hydroperoxide, di(tertiary alkyl) peroxide, di(tertiarybutyl)peroxide, peracetic acid, perphthalic acid, and the like, and mixtures thereof. The catalysts are employed in amounts varying from about .01% to 5% by weight of the monomer being polymerized.

The catalyst selected and the temperature employed will vary depending upon the monomer and the desired molecular weight of the finished polymer. If one desires low molecular weight polymers, one should select a higher reaction temperature, such as of the order of about 150° C. to 300° C. and select a catalyst that has a satisfactory decomposition rate within that range of temperature. If higher molecular weight products are desired, one may select lower range of temperature, such as 50° C. to 125° C., and select a catalyst that decomposes at a satisfactory rate within that range. In general, it is preferred to employ temperatures within the range of 80° C. to 200° C. and catalysts that will be effective within that range.

The polymerization of the unsaturated esters of the invention through the epoxy group or groups may be accomplished by the addition of epoxy polymerization catalysts. Epoxy polymerization catalysts that are particularly effective with the esters possessing a single epoxy group are the Friedel-Crafts catalysts, such as aluminum chloride, aluminum bromide, zinc chloride, boron trifluoride, silicon tetrachloride, stannic chloride, stannic bromide, titanium tetrachloride, bismuth trichloride, and the like. These catalysts are preferably employed in amounts varying from about 1% to 10% by weight of the material being polymerized. Catalysts that are particularly effective with the esters possessing a plurality of epoxy groups include amine catalysts, such as ethylene diamine, 2,4,6-tri(dimethylaminomethyl)phenol, amine aldehyde resins, amide-aldehyde resins, dialdehydes, polybasic acids, such as argonic acid and mineral acids, and their anhydrides, polymercaptans, and the like. These catalysts are utilized preferably in amounts varying from about .1% to 5% by weight of the material being polymerized. In many cases, the polymerization may be effected by merely adding the catalysts, but in some cases, and particularly in the case of the polyepoxide esters it may be necessary to heat at temperatures varying preferably from about 30° C. to 80° C.

To illustrate the manner in which the invention may be carried out, the following examples are given. It is to be understood, however, that the examples showing products of the invention derived from epoxidized polycarboxylic acids having up to and including 36 carbon atoms per molecule are for the purpose of illustration and the invention is not be be regarded as limited to any of the specific materials or conditions recited therein.

*Example I*

This example illustrates the preparation and properties of the diallyl ester of epoxidized 8,12-eicosadienedioate.

84 parts (.2 mole) of diallyl 8,12-eicosadienedioate (prepared by reacting 8,12-eicosadienedioate with allyl alcohol) was added to 500 parts of chloroform. 112 parts of a 27% peracetic acid solution was then added to the mixture and the resulting mixture allowed to stand at 0° C. to 10° C. for 12 hours. The product was then washed with ice water, cold 20% sodium hydroxide, ice water and then filtered through sodium sulfate, chloroform was then taken off and the product concentrated to a viscous liquid (boiling point of about 235° C. at .15 mm.) which was the diallyl ester of epoxidized 8,12-eicosadienedioate. Ester value 0.485 eq/100 g. iodine value 132 eq/100 g., α-epoxy value 0.137, direct oxygen percent w. 19.7.

About 5 parts of stannic chloride in chloroform is slowly added to 100 parts of the above-described epoxidized ester. In a short period, the product set up to a soft solid. 100 parts of the epoxidized ester was also heated with 2% benzoyl peroxide to form a soft solid. Then 3 parts of the 2,4,6-tri(dimethylaminomethyl) phenol and 2 parts of benzoyl peroxide are added to 100 parts of the above ester and the mixture heated to 70° C. The epoxidized ester set up to a very hard casting.

*Example II*

This example illustrates the preparation and properties of the diallyl ester of epoxidized 4-cyclohexene-1,2-dicarboxylate.

About 252 parts of diallyl 4-cyclohexene-1,2-dicarboxylate (prepared by condensing butadiene with diallyl maleate) is added to 1000 parts of chloroform. 281 parts of a 27% peracetic acid solution is then added to the mixture and the mixture allowed to stand at 0° C. to 10° C. for 10 hours. The product is then washed with ice water, cold 20% sodium hydroxide, ice water and then filtered through sodium sulfate. Chloroform is then taken off and the product concentrated to a high boiling viscous colorless liquid which is the diallyl ester of epoxidized 4-cyclohexene-1,2-dicarboxylate.

About 100 parts of the above-described epoxidized ester is polymerized in the presence of 1% stannic chloride to form a viscous liquid polymer. This polymer is dissolved in a ketone solvent and the mixture applied to metal strips. The metal strips are baked at 200° C. for 30 minutes whereby a clear hard film is obtained.

When 3 parts of benzoyl peroxide is added to a portion of the viscous liquid polymer formed above, the mixture heated to 70° C., a hard solid casting is obtained.

Esters having related properties are obtained by replacing the diallyl 4-cyclohexene-1,2-dicarboxylate with equivalent amounts of each of the following esters: dimethallyl 4-cyclohexene-1,2-dicarboxylate, di(4-hexenyl) 4,5-dimethyl-4-cyclohexene-1,2-dicarboxylate.

*Example III*

This example illustrates the preparation and properties of the di(allyloxyethyl) ester of epoxidized 4-cyclohexene-1,2-dicarboxylate.

About 340 parts of di(allyloxyethyl) 4-cyclohexene-1,2-dicarboxylate (prepared by condensing butadiene with di(allyloxyethyl) maleate) is added to 1000 parts of chloroform. 281 parts of a 27% peracetic acid solution is then added to the mixture and the resulting mixture allowed to stand at 0° C. to 10° C. for about two days. The product is then washed with ice water, cold 20% sodium hydroxide, ice water and then filtered through sodium sulfate. Chloroform is then taken off and the product concentrated to heavy colorless oil which is the di(allyloxyethyl) ester of epoxidized 4-cyclohexene-1,2-dicarboxylate.

The above ester is compatible with poly(vinyl chloride) and acts as a combined plasticizer and stabilizer for that polymer when added in amounts varying from 30 parts to 40 parts per 100 parts of polymer.

100 parts of the above ester is polymerized in the presence of 5% benzoyl peroxide at 70° C. to form a hard insoluble infusible solid polymer which is useful as a resin for removing hydrogen chloride and other epoxy reactive impurities.

Related esters are obtained by replacing the di(allyloxyethyl)-4-cyclohexene-1,2-dicarboxylate in the above described process with equivalent amounts of each of the following: di(allyloxypropyl) 5-butyl-4-cyclohexene-1,2-dicarboxylate, di(methallyloxypropyl) 4-cyclohexene-1,2-dicarboxylate and di(allyloxypropyl) 1,2,5,6-tetrachloro-4-cyclohexene-1,2-dicarboxylate.

*Example IV*

One mole of diallyl ester of dimerized linoleic acid is added to 1000 parts of chloroform. 281 parts of a 27% peracetic acid solution is then added to the mixture and the resulting mixture allowed to stand at 0° C. for 10 hours. The product is then washed as shown in the preceding example and the chloroform taken off to yield a viscous liquid ester identified as the diallyl ester of epoxidized dimerized linoleic acid.

About 100 parts of the above-described epoxidized ester is polymerized in the presence of 1% stannic chloride to form a linear polymer. This polymer is dissolved in a coating solvent and the mixture applied to metal strips. The metal strips were baked at 200° C. for 30 minutes to form a hard clear film.

When 3 parts of benzoyl peroxide is added to a portion of the linear polymer formed above, and the mixture heated to 70° C. a hard solid casting is obtained.

*Example V*

About 390 parts of divinyl 8,12-eicosadienedioate (prepared by reacting 8,12-eicosadienedioic acid with vinyl acetate as described in U. S. 2,245,131) is added to 1000 parts of chloroform. 562 parts of a 27% peracetic acid solution is then added to the mixture and the mixture allowed to stand at 0° C. to 10° C. The product is then washed with ice water, cold 20% sodium hydroxide, ice water and then filtered through sodium sulfate. Chloroform is then taken off and the product concentrated to a viscous colorless liquid which is the divinyl ester of epoxidized 8,12-eicosadienedioate.

About 100 parts of the above-described epoxidized ester is polymerized in the presence of 1% stannic chloride to form a liquid polymer. When this polymer is dissolved in a ketone coating solvent, the mixture applied to metal strips and cured at 200° C., it forms a clear hard film.

The above epoxidized ester is also polymerized to a soft polymer by heating with 3% benzoyl peroxide at 70° C.

Esters having related properties are obtained by replacing the divinyl 8,12-eicosadienedioate in the above process with equivalent amounts of each of the following esters: divinyl 3,5-cyclohexadiene-1,2-dicarboxylate, divinyl 3-acetoxy-4-cyclohexene-1,2-dicarboxylate.

*Example VI*

About one mole of divinyl 1,4-cyclohexadiene-1,2-dicarboxylate (prepared by reacting 1,4-cyclohexadiene-1,2-dicarboxylic acid with vinyl acetate as described in U. S. 2,245,131) is added to 1000 parts of chloroform. 281 parts of a 27% peracetic acid solution is then added to the mixture and the mixture allowed to stand at about 0° C. The product is then washed with ice water, cold NaOH and ice water and then filtered through sodium sulfate. Chloroform is then taken off and the product concentrated to a viscous colorless liquid which is the divinyl ester of epoxidized 1,4-cyclohexadiene-1,2-dicarboxylate.

100 parts of the above ester is polymerized in the presence of 5% benzoyl peroxide at 70° C. to form a hard insoluble infusible solid polymer which may be used as resin for removing hydrogen chloride.

Related esters are obtained by replacing the divinyl 1,4-cyclohexadiene-1,2-dicarboxylate with equivalent amounts of each of the following: divinyl 3-chloro-1,4-cyclohexadiene-1,2-dicarboxylate and divinyl 3-methyl-3,5-cyclohexadiene-1,2-dicarboxylate.

We claim as our invention:

1. A neutral ester of (1) a diepoxy-substituted polycarboxylic acid which has not more than three carboxyl groups and is free from epoxy-blocking groups, consisting of a completely epoxidized diethylenic unsaturated unsubstituted polycarboxylic acid having 6 to 36 carbon atoms per molecule wherein the

—C=C— groups are converted to

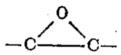

groups, and (2) an alcohol having an aliphatic carbon-to-carbon unsaturated linkage and containing 2 to 18 carbon atoms per molecule of the group consisting of the unsubstituted monohydric alcohols and their monochloro-substitution products.

2. An ester as defined in claim 1 wherein the epoxy-substituted polycarboxylic acid is an epoxidized polyethylenically unsaturated aliphatic polycarboxylic acid containing at least six carbon atoms and having at least one of the ethylenic groups in an internal position at least one carbon atom removed from the carboxyl groups.

3. An ester as defined in claim 1 wherein the epoxy-substituted polycarboxylic acid is an epoxidized dimerized polyethylenically unsaturated fatty acid.

4. An ester as defined in claim 1 wherein the epoxy-substituted polycarboxylic acid is an epoxidized polyethylenically unsaturated polycarboxylic acid comprising the reaction product of a cyclic peroxide with a compound containing a conjugated system of double bonds in the presence of iron and a reducing agent.

5. A diester of (1) a diepoxy-saturated hydrocarbon dicarboxylic acid free from epoxy-blocking groups and having 6 to 36 carbon atoms per molecule wherein the epoxy groups have the structure

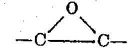

and (2) an unsubstituted aliphatic monoethylenic alcohol having 2 to 18 carbon atoms per molecule.

6. A diester of a completely epoxidized diethylenically unsaturated aliphatic dicarboxylic acid containing 6 to 22 carbon atoms and having the ethylenic groups converted to

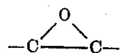

groups and an alkenol having 2 to 18 carbon atoms per molecule.

7. A dialkenyl ester of a diepoxy-substituted alkanedioic acid having 6 to 22 carbon atoms wherein the alkenyl groups each contain 2 to 18 carbon atoms.

8. A di(lower alkenyl) ester of diepoxyeicosanedioate.

9. Diallyl ester of epoxidized 8,12-eicosadienedioate.

10. Divinyl ester of epoxidized 8,12-eicosadienedioate.

11. Diallyl ester of epoxidized dimerized linoleic acid.

References Cited in the file of this patent

UNITED STATES PATENTS

| | | |
|---|---|---|
| 2,464,137 | Levy et al. | Mar. 8, 1949 |
| 2,475,557 | Swern et al. | July 5, 1949 |
| 2,485,160 | Niederhauser et al. | Oct. 18, 1949 |
| 2,680,109 | Stevens et al. | June 1, 1954 |

OTHER REFERENCES

Everett: J. Chem. Soc. 1950:3133 (ethyl-1,2,6,7-diepoxy heptane-3,3 dicarboxylate).

Gill: J. Chem. Soc., 1952; 4630–2.